(12) United States Patent
Murata

(10) Patent No.: US 8,284,430 B2
(45) Date of Patent: Oct. 9, 2012

(54) FACSIMILE APPARATUS

(75) Inventor: Akikazu Murata, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 715 days.

(21) Appl. No.: 12/407,777

(22) Filed: Mar. 19, 2009

(65) Prior Publication Data

US 2009/0244613 A1 Oct. 1, 2009

(30) Foreign Application Priority Data

Mar. 28, 2008 (JP) ................................. 2008-088587

(51) Int. Cl.
*H04N 1/04* (2006.01)
(52) U.S. Cl. ........ 358/1.15; 358/475; 358/474; 358/497
(58) Field of Classification Search ................ 358/1.15, 358/475, 474, 497, 498
See application file for complete search history.

(56) References Cited

U.S. PATENT DOCUMENTS 7,773,808 B2 * 8/2010 Lim et al. ...................... 382/181

FOREIGN PATENT DOCUMENTS

| JP | H09-218841 A | 8/1997 |
|----|-------------|--------|
| JP | 2000-218976 A | 8/2000 |
| JP | 3405263 B2 | 5/2003 |
| JP | 3423728 B2 | 7/2003 |
| JP | 2005-192092 A | 7/2005 |
| JP | 2006-217552 A | 8/2006 |
| JP | 2006-331094 A | 12/2006 |

OTHER PUBLICATIONS

Japan Patent Office; Notification of Reason for Refusal in Japanese Patent Application No. 2008-088587 (counterpart to the above captioned US application) mailed May 18, 2010.
Japan Patent Office, Notification of Reason for Refusal for Japanese Patent Application No. 2008-088587 (counterpart to above-captioned patent application), mailed Aug. 17, 2010.

* cited by examiner

*Primary Examiner* — Houshang Safaipour
(74) *Attorney, Agent, or Firm* — Baker Botts L.L.P.

(57) ABSTRACT

A facsimile apparatus, including: a receiving device which receives facsimile information; an identifying information providing portion which provides identifying information for identifying the facsimile information received by the receiving portion; a facsimile information storing device which stores the facsimile information and the identifying information provided by the identifying information providing portion in a state in which the identifying information is corresponded to the facsimile information; an outputting controlling section which controls at least one of a display device and an outputting device to output the facsimile information corresponded to the identifying information; an outputted information storing device which stores outputted information indicating that the facsimile information has already been outputted by the outputting controlling section; and an informing section which informs the outputted information stored in the outputted information storing device, in a state in which the outputted information is combined with the identifying information corresponded to the outputted information.

20 Claims, 12 Drawing Sheets

FIG.3A  FAX HISTORY TABLE

| FAX ID | FAX NUMBER | RECEIVED DATE | USER A | USER B | USER C | USER D | ... |
|---|---|---|---|---|---|---|---|
| 000 | 052-xxx-xxxx | 08/02/01 | 10 | 01 | 01 | 00 | ... |
| 001 | 052-xxx-xxxx | 07/12/11 | 10 | 00 | 01 | 00 | ... |
| 002 | 0596-xx-xxxx | 07/12/10 | 00 | 00 | 01 | 00 | ... |
| 003 | 03-xxxx-xxxx | 07/12/03 | 00 | 00 | 01 | 10 | ... |
| 004 | 03-xxxx-xxxx | 07/12/01 | 00 | 00 | 01 | 10 | ... |
| ⋮ | ⋮ | ⋮ | ⋮ | ⋮ | ⋮ | ⋮ | ⋮ |

FIG.3B  ADDRESS BOOK MANAGEMENT TABLE

| REGISTRATION NAME | FAX NUMBER | USER A | USER B | USER C | USER D | ... |
|---|---|---|---|---|---|---|
| AA | 052-xxx-xxxx | 1 | 1 | 1 | 0 | ... |
| BB | 0764-xx-xxxx | 1 | 1 | 0 | 0 | ... |
| CC | 0426-xx-xxxx | 0 | 1 | 0 | 0 | ... |
| DD | 03-xxxx-xxxx | 0 | 0 | 1 | 1 | ... |
| ⋮ | ⋮ | ⋮ | ⋮ | ⋮ | ⋮ | ⋮ |

FIG.3C  USER ID TABLE

| USER ID | USER NAME |
|---|---|
| 100 | A |
| 101 | B |
| 102 | C |
| 103 | D |
| ⋮ | ⋮ |

FIG.6A

```
February 7
13:15
```

FIG.6B

```
Mr.A                    13:15
    K—[ADDRESS BOOK]
       CHECK RECEIVED FAX
```

FIG.6C

```
Mr.A
      RECORDED      K—[REGISTER
                       NEW
   Mr.AA  052-xxx-xxxx  NUMBER]
                    DELETE
                    REGISTRATION
                    NUMBER
```

FIG.6D

```
Mr.A                    13:15
       ADDRESS BOOK
    K—[CHECK RECEIVED FAX]
```

FIG.6E

| Mr.A | ADDRESSER | RECEIVED DATE | FAX-READ USER |
|---|---|---|---|
| K— | Mr.AA | 08/02/01 | --- |
|  | Mr.AA | 07/12/11 | Mr.B, Mr.A |
|  | Mr.BB | 07/12/10 | Mr.A |

FACSIMILE APPARATUS

CROSS REFERENCE TO RELATED APPLICATION

The present application claims priority from Japanese Patent Application No. 2008-088587, which was filed on Mar. 28, 2008, the disclosure of which is herein incorporated by reference in its entirety.

BACKGROUND OF THE INVENTION

1. Field of the Invention

The present invention relates to a facsimile apparatus.

2. Description of the Related Art

There is conventionally known a facsimile apparatus in which data sent from an addresser is received via a communication line, and the received data is converted to record images or characters on a recording sheet, and in which an original document is read to send the read data to an addressee via the communication line.

Further, this facsimile apparatus has (a) a memory-receiving function in which the received data is stored in an inner memory without immediately recording the receiving data on the recording sheet, and where a command from a user is inputted, the inputted data is outputted on the recording sheet and/or a display device, and (b) a user authorizing function in which the output is permitted on condition that an authorized (i.e., proper) user ID is inputted, thereby preventing that a content of the received data is visually recognized by an unauthorized person.

Meanwhile, Patent Document 1 (Japanese Patent Application Publication No 2000-218976) discloses a circulation management apparatus in which a list of a plurality of names of persons to which fax is to be circulated are displayed, and in the circulation, a name of a person who has read the fax (that is, the circulation is finished) is deleted from the list, whereby a user can easily judge to whom the fax is circulated next by referring the display of the list.

SUMMARY OF THE INVENTION

However, even in the facsimile apparatus having the above-described memory-receiving function and the user authorizing function, since a user can output the received data on the display device if the user is authorized, it is uncertain whether a person having visually recognized a content of the received data exists or not. Likewise, in the above-described circulation management apparatus, since the name of the person who has read the fax is deleted from the list, it is also uncertain whether the person having visually recognized the content of the received data exists or not.

This invention has been developed in view of the above-described situations, and it is an object of the present invention to provide a facsimile apparatus in which where facsimile information stored in an inner memory has been visually recognized, a person who has not visually recognized the facsimile information (who is to be visually recognized the facsimile information afterwards) can recognize a fact that a person having already visually recognized the facsimile information exists.

The object indicated above may be achieved according to the present invention which provides a facsimile apparatus comprising: a facsimile apparatus, comprising: a receiving device configured to receive facsimile information; an identifying information providing portion configured to provide identifying information for identifying the facsimile information received by the receiving portion; a facsimile information storing device configured to store the facsimile information and the identifying information provided by the identifying information providing portion in a state in which the identifying information is corresponded to the facsimile information; an identifying information displaying controlling section configured to control a display device to display a list of the identifying information(s) stored in the facsimile information storing device; a selecting section configured to select the identifying information from the list displayed by the identifying information displaying controlling section; an outputting controlling section configured to control at least one of the display device and an outputting device to output the facsimile information corresponded to the identifying information having been selected by the selecting section; an outputted information storing device configured to store outputted information indicating that the facsimile information has already been outputted by the outputting controlling section; and an informing section configured to inform the outputted information stored in the outputted information storing device in a state in which the outputted information is combined with the identifying information corresponded to the outputted information.

The object indicated above may also be achieved according to the present invention which provides a facsimile apparatus, comprising: a receiving device configured to receive facsimile information; an identifying information providing portion configured to provide identifying information for identifying the facsimile information received by the receiving portion; a facsimile information storing device configured to store the facsimile information and the identifying information provided by the identifying information providing portion in a state in which the identifying information is corresponded to the facsimile information; an outputting controlling section configured to control at least one of a display device and an outputting device to output the facsimile information corresponded to the identifying information; an outputted information storing device configured to store outputted information indicating that the facsimile information has already been outputted by the outputting controlling section; and an informing section configured to inform the outputted information stored in the outputted information storing device, in a state in which the outputted information is combined with the identifying information corresponded to the outputted information.

The object indicated above may also be achieved according to the present invention which provides a facsimile apparatus, comprising: a receiving device configured to receive facsimile information; an identifying information providing portion configured to provide identifying information for identifying the facsimile information received by the receiving portion; a facsimile information storing device configured to store the facsimile information and the identifying information provided by the identifying information providing portion in a state in which the identifying information is corresponded to the facsimile information; an identifying information displaying controlling section configured to control a display device to display a list of the identifying information stored in the facsimile information storing device; a selecting section configured to select the identifying information from the list displayed by the identifying information displaying controlling section; an outputting controlling section configured to control at least one of the display device and an outputting device to output the facsimile information corresponded to the identifying information having been selected by the selecting section; an outputted information storing device configured to store outputted information indicating that the facsimile information has already been outputted by the outputting controlling section; and an informing section configured to inform the outputted information stored in the outputted information storing device in a state in which the outputted information is combined with the facsimile information corresponded to the outputted information.

In the facsimile apparatuses constructed as described above, a person who has not visually recognized (who is to be visually recognized the facsimile information afterwards) can recognize whether the facsimile information has outputted or not, that is, whether a person having already visually recognized the facsimile information stored in the facsimile information storing device exists or not.

BRIEF DESCRIPTION OF THE DRAWINGS

The objects, features, advantages, and technical and industrial significance of the present invention will be better understood by reading the following detailed description of a preferred embodiment of the invention, when considered in connection with the accompanying drawings, in which:

FIG. 3A is a view showing a fax history table, FIG. 3B is a view showing an address book management table, and FIG. 3C is a view showing a user ID table;

FIGS. 6A through 6E are views each showing a display in the main processing;

DESCRIPTION OF THE PREFERRED EMBODIMENT

Figure 1:
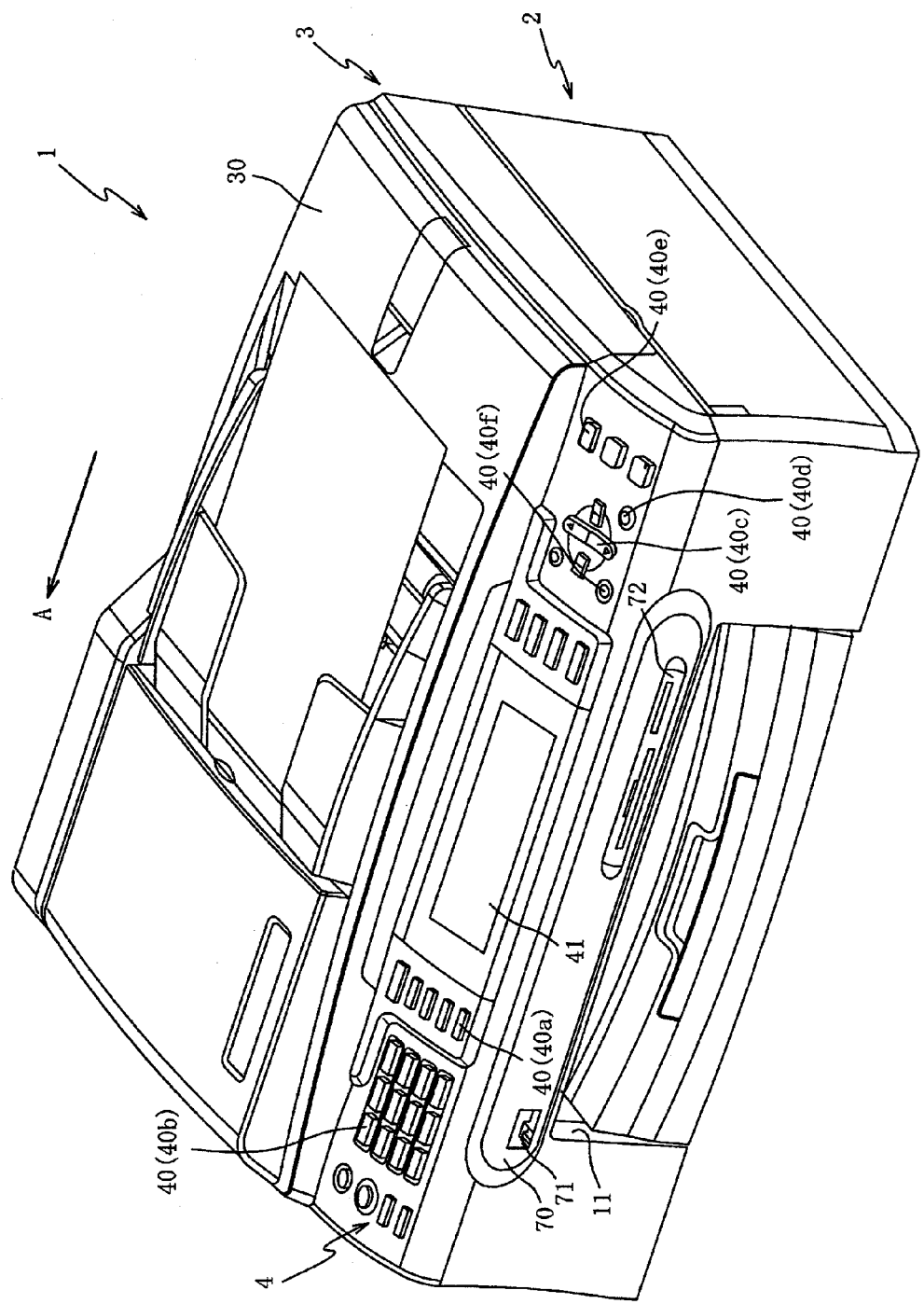
FIG. 1 is a perspective view showing an external construction of a Multi Function Device (MFD)

Hereinafter, there will be described a preferred embodiment of the present invention by reference to the drawings.

A Multi Function Device (MFD) 1 integrally includes a printer section 2 as an outputting device at its lower portion, a scanner section 3 at its upper portion, and an operational panel 4 in front of the scanner section 3. The MFD 1 has several functions such as a scanner function, a copying function, a facsimile function, and a printer function.

It is noted that the MFD 1 further has functions such as (a) a function in which where the MFD 1 is connected to an external device, e.g., a USB memory, a digital camera, a personal computer, and so on, images or characters are recorded on a recording sheet on the basis of data received from the external device, and (b) a function in which images or characters are displayed on a Liquid Crystal Display (LCD) 41 on the basis of data received from the external device.

An opening 11 is formed in a front portion of a printer section 2. In the opening 11, a sheet-supply tray and a sheet-discharge tray are provided so as to be superposed on each other in a vertical direction such that each of the sheet-supply tray and the sheet-discharge tray is partly exposed from the opening 11. Recording sheets stacked on the sheet-supply tray are supplied, one by one, into the printer section 2. After a desired image is recorded on the supplied recording sheet, the recording sheet is discharged onto the sheet-discharge tray.

Where the MFD 1 functions as a receiving device of a facsimile, facsimile information (hereinafter referred to as "fax") sent from an addresser (i.e., a sender) is stored in a fax-data memory 23a (with reference to FIG. 2) which will be described below. When a user commands recording of images or characters on the basis of the received fax, that is, the user commands a recording operation on the basis of the received fax, the images or characters are recorded on the recording sheet by the printer section 2 on the basis of the received fax.

The scanner section 3 is constituted as what is called a flat-bed scanner. A document cover 30 is provided as a top plate of the MFD 1. Below the document cover 30, a platen glass, not shown, is disposed. A document is placed on the platen glass and read by the scanner section 3 in a state in which the document is covered by the document cover 30. Where the MFD 1 functions as a sending device of the facsimile, a document to be sent to an addressee (i.e., a receiver) is read by the scanner section 3, and data read by the scanner section 3 is sent to the addressee.

The operational panel 4 is a component of the MFD 10 through which the user operates the printer section 2 and the scanner section 3. On the operational panel 4, there are provided an LCD 41 and various operational keys 40 such as function selecting keys 40a, numeric keys 40b, direction keys 40c, a determination key 40d, a user ID confirmation key 40e, a stop key 40f, and so on.

The function selecting keys 40a are keys for commanding execution of operations for realizing the scanner function, the copying function, the facsimile function, the printer function, and so on. The numeric keys 40b are keys for inputting a number of copying, a facsimile number, and so on. The direction keys 40c are keys for moving a position of a cursor displayed on the LCD 41. The determination key 40d is a key for commanding execution of various operations. The user ID confirmation key 40e is a key for commanding execution of a processing for verifying a user ID assigned to a user in order to verily whether the user intending to use the MFD 1 has an authority to use the MFD 1. The stop key 40f is a key for inputting a command of stopping or canceling the various operations.

Where a predetermined command is inputted to the MFD 1 through any of the operational keys 40, an operation of the MFD 1 is controlled by a controller 80 (with reference to FIG. 2) in response to the command. It is noted that the MFD 1 is configured to be operated on the basis of commands transmitted from the external computer via a printer driver, a scanner driver, and the like in addition to the commands inputted through the operational keys 40.

Where a direction indicated by arrow A in FIG. 1 is defined as a widthwise direction of the LCD 41, the LCD 41 has an oblongly rectangular shape having a depth-to-width ratio of 3:8. More specifically, the LCD 41 includes two displays arranged side by side in the direction indicated by the arrow A. Each of the two displays has a depth-to-width ratio of 3:4. It is noted that FIG. 1 is shown by ignoring the ratio. Further, what is called a touch panel is integrally provided on the LCD 41. When any of various button images displayed on the LCD 41 is selected or touched by the user, a command assigned to the selected button image is inputted.

A connection panel 70 is provided under the operational panel 4 and above the opening 11. The connection panel 70 is provided with a USB terminal 71 at its left end portion. The USB terminal 71 is a connector terminal for connecting the external device and the MFD 1 via USB connecting so as to be communicable with each other.

The connection panel 70 is provided with a slot portion 72 at its right end portion. The slot portion 72 includes a plurality of card slots in each of which a memory card (i.e., a card-type memory) can be inserted or mounted. When the memory card is inserted into any of the card slots, the controller 80 described below can read image data from the inserted memory card to display an image on the LCD 41 on the basis of the read image data and to record the image on the recording sheet on the basis of the read image data.

Figure 2:
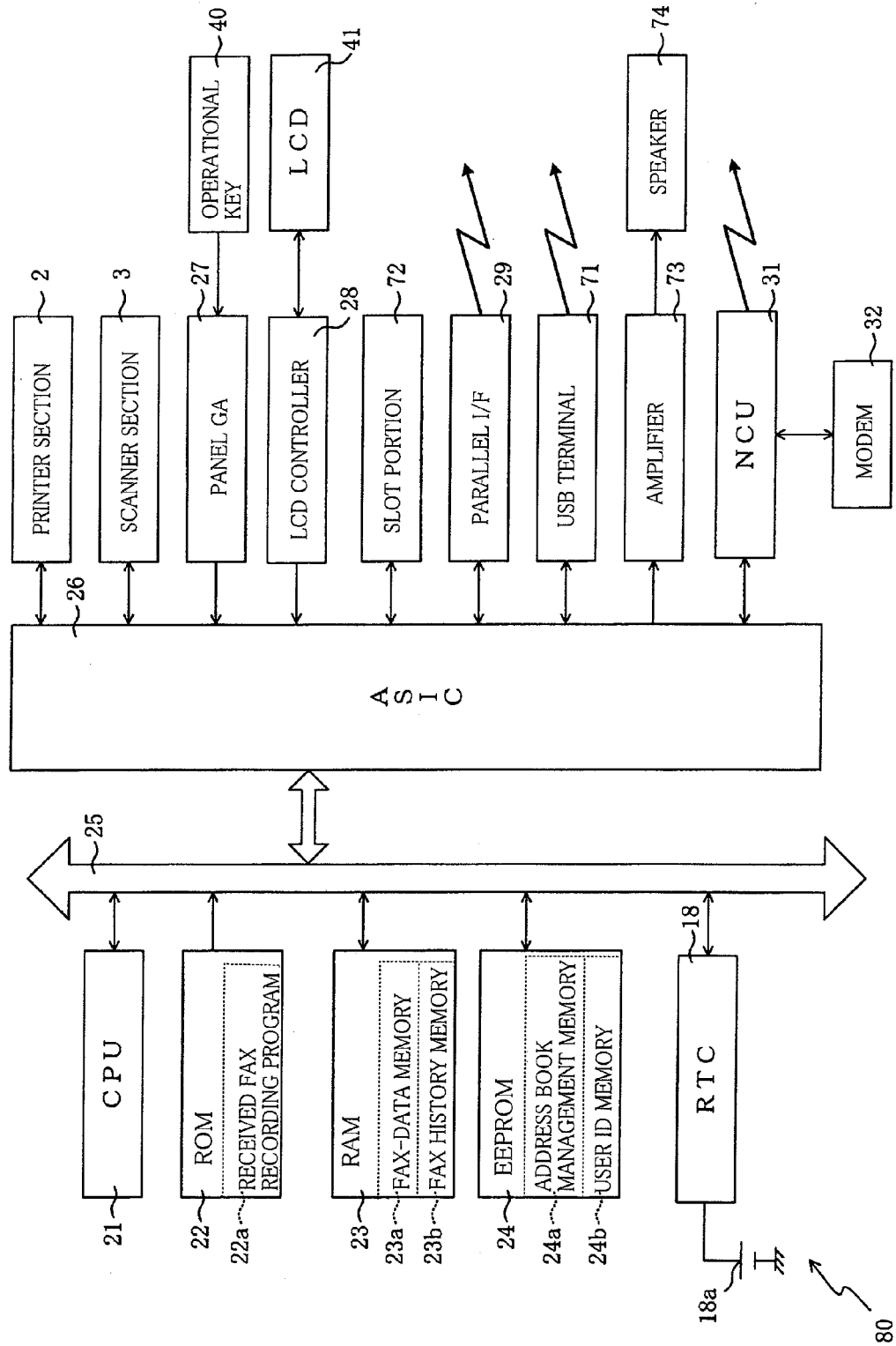
FIG. 2 is a block diagram showing a general configuration of a controller of the MFD.

There will be explained, with reference to FIG. 2, a general configuration of the controller 80 for executing controls of operations of the MFD 1. FIG. 2 is a block diagram showing the general configuration of the controller 80. The controller 80 is configured to perform the controls over the operations of the MFD 1 including the printer section 2, the scanner section 3, and the operational panel 4.

The controller 80 is essentially constituted by a microcomputer including a Central Processing Unit (CPU) 21, a Read Only Memory (ROM) 22, a Random Access Memory (RAM) 23, and an Electrically Erasable and Programmable ROM (EEPROM) 24, and is connected to an Application Specific Integrated Circuit (ASIC) 26 via a bus 25.

The CPU 21 functions as a processor that controls the MFD 1 as a whole and is operated on the basis of a program stored in the ROM 22. The ROM 22 stores the program for controlling the various operations of the MFD 1. For example, the ROM 22 stores a received fax recording program 22a.

This received fax recording program 22a is a program for executing a received fax checking processing which will be described below and a processing in which user-selected received fax which is stored in the fax-data memory 23a is recorded on the recording sheet.

The RAM 23 is used as a storage area or a working area which temporarily stores various data used when the CPU 21 executes the program and includes the fax-data memory 23a and a fax history memory 23b.

The fax-data memory 23a as a facsimile information storing device is an area for storing the fax received in the facsimile function and stores the received fax, a fax ID for identifying the fax, date and time of receiving the fax, and a facsimile number of the addresser having sent the fax, in a state in which the received fax, the fax ID, the date and time, and the facsimile number are corresponded to each other. In the received fax checking processing which will be described below, when the fax is selected, the fax is read from the fax-data memory 23a and displayed on the LCD 41.

The fax history memory 23b as an outputted information storing device is an area for storing a history of each received fax, and a user (a fax-read user) who has already read the fax, a user (a fax-unread user) who has not read the fax yet, and a user (a no-right user) not having a right to read the fax in correspondence with the history of each received fax. That is, the fax history memory 23b stores outputted information indicating that the fax has already outputted. For example, the fax history memory 23b stores a fax history table shown in FIG. 3A. As shown in FIG. 3A, in the fax history table, there are stored a "FAX ID" 50, a "FAX NUMBER" 51, a "RECEIVED DATE" 52 each as a history of each received fax. In the "FAX ID" 50, there is stored an ID number which is individually assigned to each received fax. In the "FAX NUMBER" 51, there is stored a fax number of the addresser who has sent the fax received by the user. In the "RECEIVED DATE" 52, there is stored date information at which the fax has been received.

Further, in this fax history table as an identifying information related information storing device, there is stored information, as operator information including the outputted information, about whether each of users 53a-53d is the fax-read user, the fax-unread user, or the no-right user, in correspondence with the history of each fax. Specifically, where the user is the fax-read user, the fax-history table stores "10", where the user is the fax-unread user, the fax history table stores "01", and where the user is the no-right user, the fax history table stores "00".

For example, as to the fax having the received history in which the "FAX ID" 50 is "000", the "FAX NUMBER" 51 is "052-XXX-XXXX", and the "RECEIVED DATE" 52 is "08/02/01", since the "USER A" 53a is "10", the "USER A" has read the fax. Likewise, since each of the "USER B" 53b and the "USER C" 53c is "01", the "USER B" and "USER C" have not read the fax yet, and since the "USER D" 53d is "00" the user D has no right to read the fax. That is, the fax history memory 23b also functions as an output permitted person storing device storing an output permitted person as an operator who is permitted to read (output) the fax. More specifically, the operator information includes information whether the operator has a right to read the fax.

The information stored in the fax history table is read when a fax history list listing the fax received histories is displayed in order to select the user-desired fax stored in the fax-data memory 23a. In other words, the fax history list is displayed on the basis of the information stored in the fax history table. Then, the information is displayed on the LCD 41. In this time, the fax-read user is displayed in correspondence with each of the histories of the fax, whereby a user to check a content of the fax can recognize, at a glance, a fax-read user(s) who has already read the fax.

Returning to FIG. 2 again, the explanation is continued. The EEPROM 24 is a rewritable non-volatile memory and includes an address book management memory 24a and a user ID memory 24b. The address book management memory 24a is an area storing the fax number and a registration name of the fax number for each of the users. For example, the address book management memory 24a stores an address book management table shown in FIG. 3B.

As shown in FIG. 3B, in the address book management table as an addresser related information storing device, there are stored, as addresser information, a "REGISTRATION NAME" 54 and a "FAX NUMBER" 55. The "REGISTRATION NAME" 54 and the "FAX NUMBER" 55 respectively stores a name of each addresser and a fax number of the addresser. Further, a user having registered the addresser is stored, as the operator information, for each of the "USER" 56a-56d. Specifically, "1" is stored with respect to a user having registered while "0" is stored with respect to a user not having registered.

For example, as to an addresser in which the "REGISTRATION NAME" 54 is "AA", and the "FAX NUMBER" 55 is "052-XXX-XXXX", since "1" is stored with respect to a "USER A" 56a, a "USER B" 56b, and a "USER C" 56c, and "0" is stored with respect to a "USER D" 56d, the addresser has been registered by users A, B, C. In other words, a user D has no right to read fax sent by the addresser.

Where the fax is received, the controller 80 judges whether the fix number of the addresser having sent the fax is registered in the address book management table or not. Where registered, the controller 80 specifies the user(s) having registered the fax number, and sets a state of the fax history table of the specified user(s) to "unread" ("01") and a state of the fax history table of another user or other users to "no right to read" ("00").

The user ID memory 24b is an area for storing the user ID for each of the users. For example, the user ID memory 24b stores a user ID table shown in FIG. 3C. As shown in FIG. 3C, in the user ID table, there are stored a "USER ID" 57 and a "USER NAME" 58. In the "USER ID" 57, there is stored the user ID which is individually assigned to each of the users. In the "USER NAME" 58, there is stored a name (a registration name) of the user to which the user ID is assigned For example, a user A is stored in the "USER NAME" 58 in correspondence that the "USER ID" 57 is "100", and a user B is stored in the "USER NAME" 58 in correspondence that the "USER ID" 57 is "101".

The MFD 1 starts up on condition that an authorized user ID is inputted. The MFD 1 verifies whether the user ID inputted by the user is an authorized user ID or not on the basis of the information stored in the user ID memory 24b, and confirms that the user ID is the authorized user ID. That is, the MFD 1 confirms that the user who is authorized and who operates the MFD 1.

Returning to FIG. 2 again, the explanation is continued. To the bus 25, a Real Time Clock (RTC) 18 is connected in addition to the components described above. A battery 18a is connected to the RTC 18, so that the RTC 18 can be driven after a power of the MFD 1 is turned off. Where the fax is received in the facsimile function of the MFD 1, the date and time at which the fax is received are obtained from this RTC 18. The date and time are stored, as the identifying information for identifying the received fax, in the fax-data memory 23a in correspondence with the received fax. That is, the RTC 18 functions as an identifying information providing portion configured to provide the identifying information.

The ASIC 26 controls, by following commands from the CPU 21, the operations of the printer section 2, the scanner section 3, the operational panel 4 (the operational keys 40 and the LCD 41), the slot portion 72, and so on. To the ASIC 26, there are connected the printer section 2, the scanner section 3, a panel gate array (panel GA) 27 for controlling the operational keys 40, an LCD controller 28 for controlling the display screen of the LCD 41, the slot portion 72, a parallel interface 29 for transmitting and receiving data to and from the external computer via a parallel cable or a USB cable, the USB terminal 71, an amplifier 73 for amplifying a signal outputted from a speaker 74. Further, a Network Control Unit (NCU) 31 is connected to the ASIC 26, and a modem 32 is connected to the NCU 31. The MFD 1 is configured to transmit and receive the fax via the NCU 31 and the modem 32. That is, the ASIC 26, the NCU 31, and the modem 32 mainly constitute a receiving device.

Figure 4:
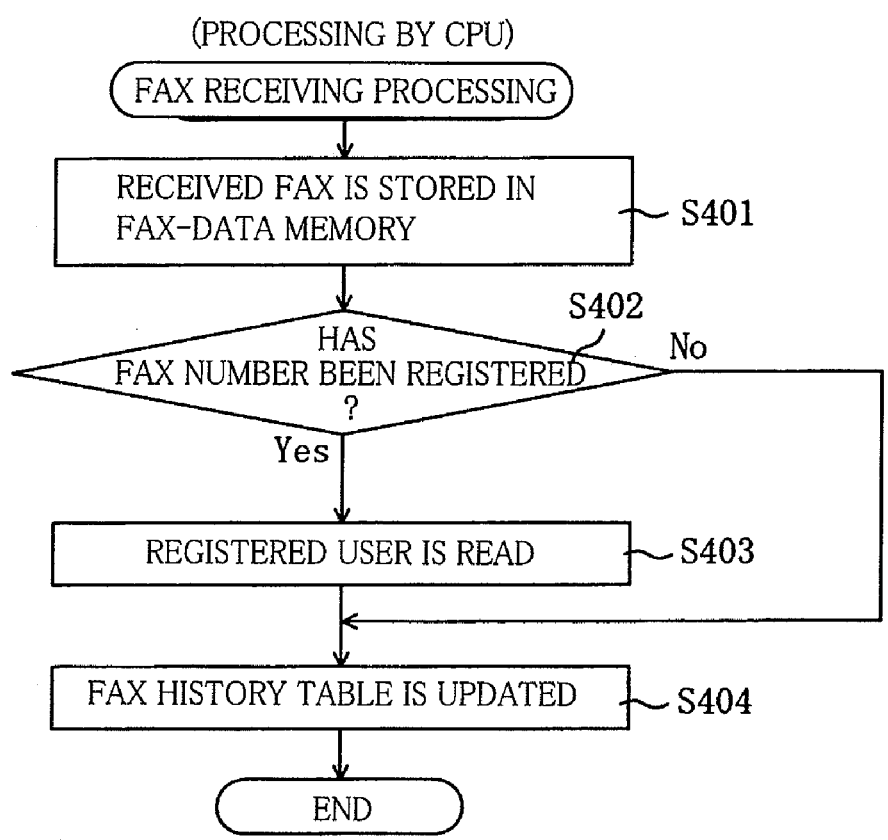
FIG. 4 is a flow-chart showing a fax receiving processing.

There will be next explained, with reference to FIG. 4, a fax receiving processing. This fax receiving processing is a processing for storing, in the fax-data memory 23a, the fax sent from the addresser and updating the fax history table. The fax receiving processing is performed when the fax is received. In this processing, initially, the received fax is stored in the fax-data memory 23a in S401. In this case, the time and date at which the fax is received are read from the RTC 18 and assigned as the identifying information to the received fax.

Then, the fax number is read from the received fax, and the controller 80 judges, in S402, whether the fax number is registered in the address book management table (with reference to FIG. 3B). Where the fax number has already been registered (S402: Yes), all the users stored in the address book management table in correspondence with the fax number (that is, users for which "1" is stored) are read in S403. Then, the fax history table is updated in S404 in order to add a received fax history, and this fax receiving processing is finished. Specifically, the history information of the received fax (that is, the fax ID, the fax number, the received date), is stored in the fax history table, and "01" (unread) is stored for all the users read in S403 while "000" (no right to read the fax) is stored for the other users, and this fax receiving processing is finished.

On the other hand, where the fax number of the received fax is not registered as a result of the judgment in S402 (S402: No), the processing in S403 is skipped, and the fax history table is updated in S404 in order to add a received fax history, and this fax receiving processing is finished. Specifically the history information of the received fax (that is, the fax ID, the fax number, the received date) is stored in the fax history table, and "01" (unread) is stored for all the users, and this fax receiving processing is finished.

In the fax receiving processing, the history information of the received fax (that is, the fax ID, the fax number, the received date) is stored or added in the fax history table. Then, as described below, where a command for displaying the received fax histories is inputted by the user in the received fax checking processing, the fax history list is updated on the basis of the information stored in the fax history table.

Figure 5:
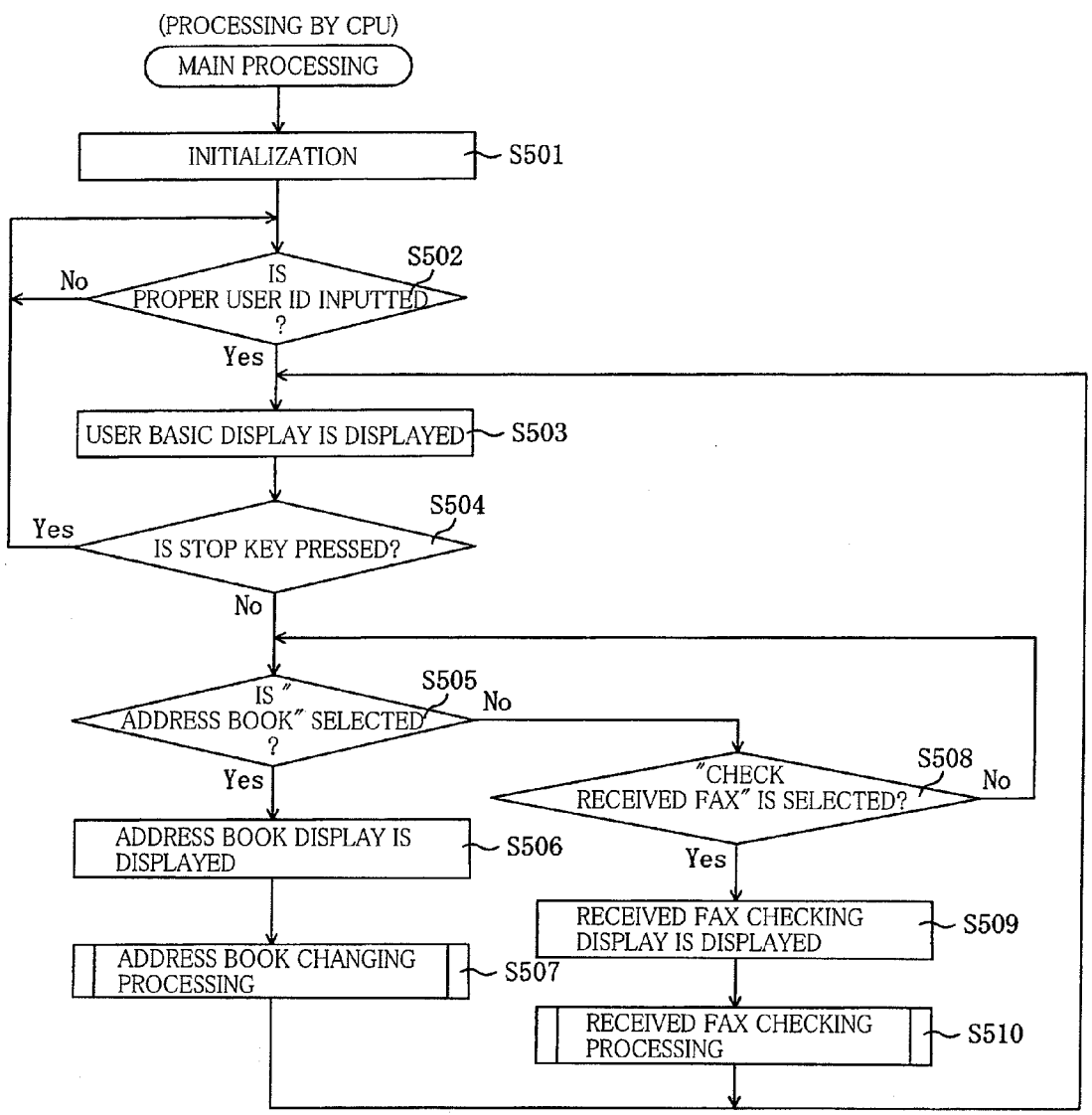
FIG. 5 is a flow-chart showing a main processing.

There will be next explained, with reference to FIG. 5, a main processing. This processing is a processing performed when one of the function selecting keys 40a which is assigned to the facsimile function is pressed. In this processing, initially in S501, the controller 80 performs initialization and judges, in S502, whether a proper user ID is inputted or not. Where the proper user ID is not inputted (S502: No), a processing in S502 is repeated, and processings after S502 are not performed. On the other hand, where the proper user ID is inputted (S502: Yes), a user basic display which will be described below is displayed on the LCD 41 in S503.

Here, there will be explained the user basic display with reference to FIGS. 6A and 6B. At the beginning of the main processing, an initial display shown in FIG. 6A is displayed on the LCD 41. Current date and time "February 7, 13:15" are displayed on this initial display. Then, when the proper user ID is inputted, the user basic display shown in FIG. 6B is displayed. On this user basic display, there are displayed a user name "Mr. A" stored in the user ID memory 24b in correspondence with the user ID inputted in S502, a current time "13:15", a command display "ADDRESS BOOK", and a command display "CHECK RECEIVED FAX". It is noted that, a box enclosed with the command display "ADDRESS BOOK" indicates a cursor box K. This cursor box K is moved by the user operating the direction keys 40c, and when the determination key 40d is pressed in a state in which the cursor box K encloses any of the commands, the command enclosed with the cursor box K is inputted.

Returning to FIG. 5 again, the explanation is continued. In the processing in S503, the user basic display shown in FIG. 6B is displayed, and then the controller 80 judges, in S504, whether the stop key 40f is pressed or not. Where pressed, (S504: Yes), the processing goes to S502. Where not pressed (S504: No), the controller 80 judges, in S505, whether the command display "ADDRESS BOOK" displayed on the user basic display shown in FIG. 6B is selected or not.

As a result, where the controller 80 has judged that the command display "ADDRESS BOOK" is selected (S505: Yes), an address book display which will be described below is displayed on the LCD 41 in S506, and then an address book changing processing is performed in S507. Specifically, where the command display "ADDRESS BOOK" displayed on the user basic display shown in FIG. 6B is selected, the address book display shown in FIG. 6C is displayed. On this address book display, there are displayed the user name "Mr. A", the fax number of the addresser information as the identifying information which is stored in the address book management table (with reference to FIG. 3B) in correspondence to "Mr. A", and so on. Specifically, there are displayed a registration name "Mr. AA" and a fax number "052-XX-XXXX" of the Mr. AA. Further, on a right side of the fax number, there are displayed a command display "REGISTER NEW NUMBER" and a command display "DELETE REGISTRATION NUMBER" which are arranged in an upward and downward direction.

The address book display shown in FIG. 6C is displayed as thus described, and then the address book changing processing is performed. Here, there will be described the address book changing processing (S507) with reference to a flow-chart in FIG. 7. This processing is for registering new addresser information and deleting registered addresser information to and from the address book management table (with reference to FIG. 3B).

Figure 7:
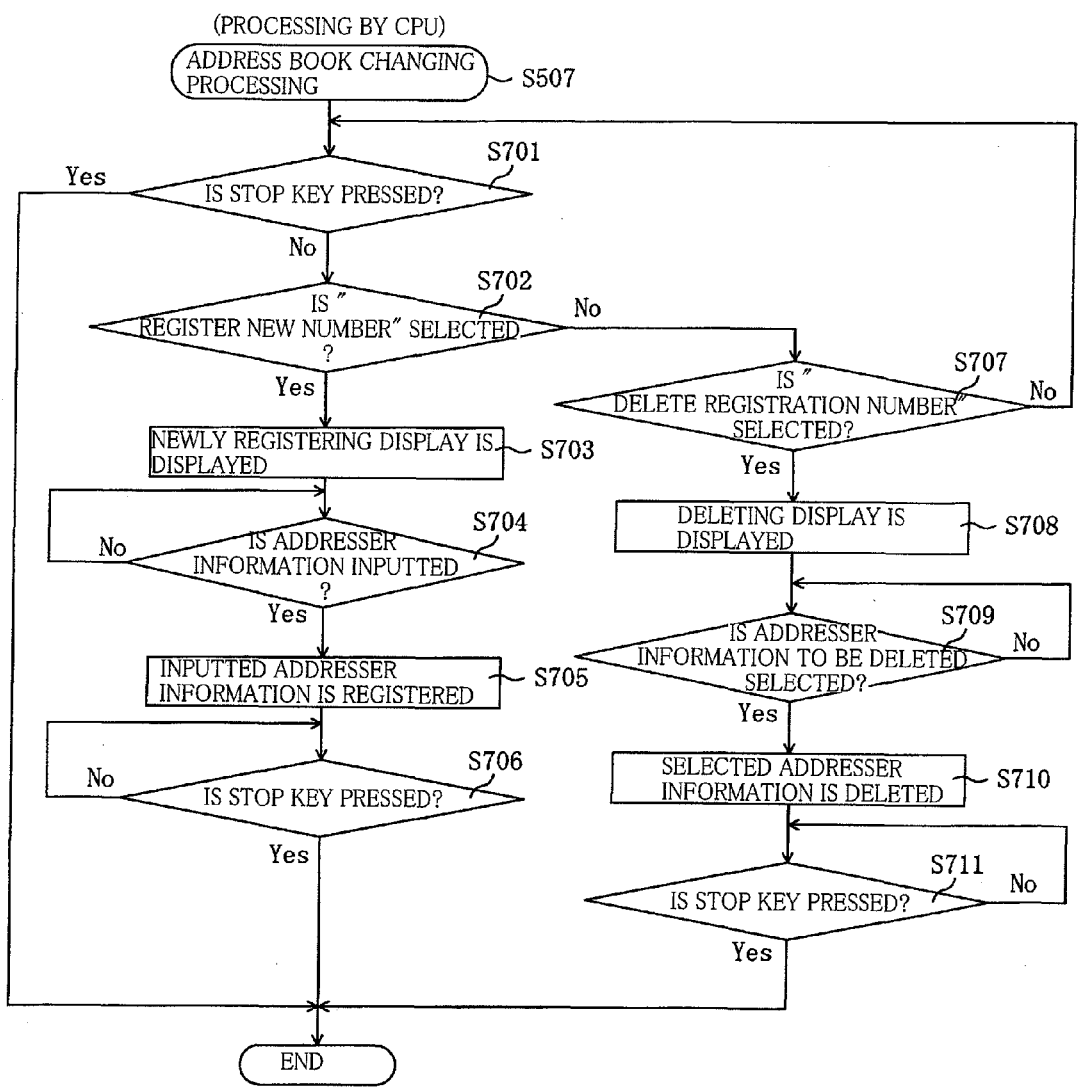
FIG. 7 is a flow-chart showing an address book changing processing.

As shown in FIG. 7, in this processing, initially, the controller 80 judges, in S701, whether the stop key 40*f* is pressed or not. Where pressed (S701: Yes), this address book changing processing is finished. Where not pressed (S701: No), the controller 80 judges, S702, whether the command display "REGISTER NEW NUMBER" displayed on the address book display shown in FIG. 6C is selected or not. As a result, where the "REGISTER NEW NUMBER" is not selected (S702: No), the processing goes to S707 which will be described below. Where selected (S702: Yes), a newly registering display is displayed in S703. Then, the controller 80 judges whether input of the new addresser information is finished or not in S704. Where not inputted (S704: No), the processing in S704 is repeated. Where inputted (S704: Yes), the inputted addresser information (i.e., the name of the addresser information and the fax number) is stored in the address book management table in S705. It is noted that the inputted addresser information is stored in correspondence with the user (Mr. A) having been judged as a current operator in S502.

Then, the controller 80 judges, S706, whether the stop key 40*f* is pressed again or not. Where not pressed (S706: No), the processing in S706 is repeated. Where pressed, (S706: Yes), the address book changing processing is finished.

Figure 8A:
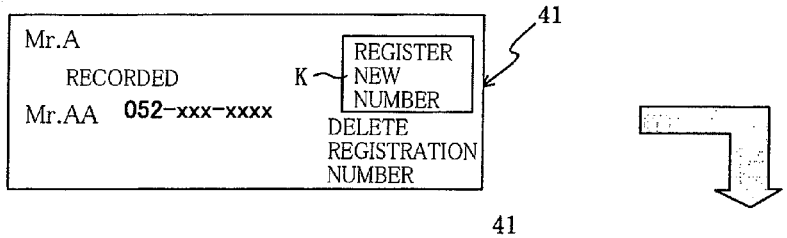
FIG. 8A through 8H are views each showing a display in the address book changing processing.
Figure 8B:
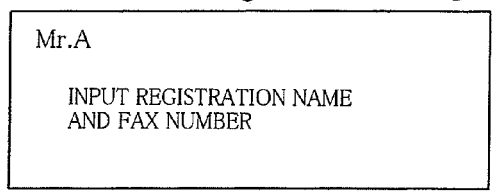

The processings so far will be specifically explained with reference to FIGS. 8A through 8D. Where the command display "REGISTER NEW NUMBER" is selected in a state in which an address book display shown in FIG. 8A (the same as the address book display shown in FIG. 6C) is displayed, the newly registering display shown in FIG. 8B is displayed on the LCD 41. On this newly registering display, there is displayed a message "INPUT REGISTRATION NAME AND FAX NUMBER" for requesting input of the addresser information is displayed.

Figure 8E:
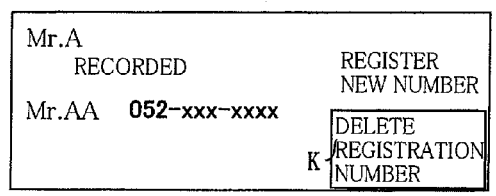
Figure 8C:
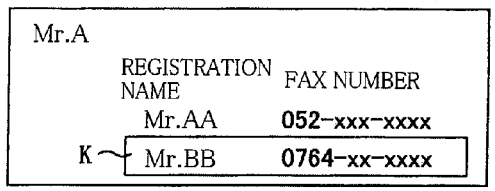

Then, where the addresser information is inputted and the determination key 40*d* is pressed by the user (Mr. A), the inputted new addresser information is stored into the address book management table. Then, the address book-display shown in FIG. 8C is displayed in a state in which the newly inputted addresser information is added. That is, the address book display in which the newly inputted addresser information "Mr. BB, 0764-XX-XXXX" is added to the address book display shown in FIG. 8A is displayed.

Then, the address book display shown in FIG. 8C is displayed until the stop key 40*f* is pressed. When the stop key 40*f* is pressed, a user basic display shown in FIG. 8D (the same as the user basic display shown in FIG. 6B) is displayed.

Returning to the flow-chart in FIG. 7 again, the explanation is continued. In the processing in S702, where a command display "REGISTER NEW NUMBER" is not selected (S702: No), the controller 80 judges, in S707, whether the command display "DELETE REGISTRATION NUMBER" is selected or not.

As a result, where the command display "DELETE REGISTRATION NUMBER" is not selected (S707: No), the processings in S701 and the following steps are repeated. Where selected (S707: Yes), a deleting display is displayed in S708. Then, the controller 80 judges, in S709, whether addresser information to be deleted is selected or not. Where not selected (S709: No), the processing in S709 is repeated. Where selected (S709: Yes), the selected addresser information is deleted, in S710, from the address book management table. It is noted that, where the addresser information to be deleted is stored in correspondence also with a user different from the user currently operating, only the selected addresser information relating to the user currently operating is deleted.

Then, the controller 80 judges, in S711, whether the stop key 40*f* is pressed again or not. Where not pressed (S711: No), the processing in S711 is repeated. Where pressed (S711: Yes), the address book changing processing is finished.

Figure 8F:
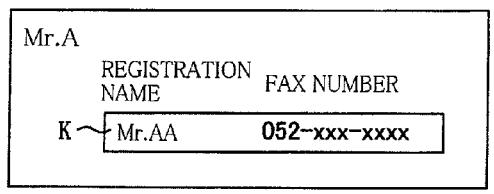
Figure 8D:
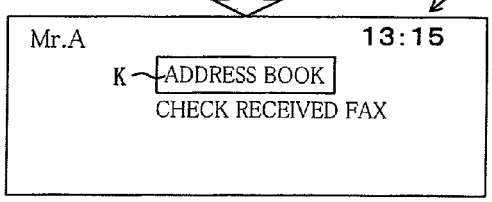

The processings so far will be specifically explained with reference to FIGS. 8E through 8H. Where, in a state in which the address book display shown in FIG. 8A (the same as the address book display shown in FIG. 6C), as shown in FIG. 8E, the cursor box K is moved to the command display "DELETE REGISTRATION NUMBER" and the determination key 40*d* is pressed, an address book display shown in FIG. 8F is displayed. On this address book display, there is displayed addresser information ("REGISTRATION NAME: Mr. AA, FAX NUMBER: 052-XXX-XXXX") stored in the address book management table in correspondence with the user name "Mr. A".

Figure 8G:
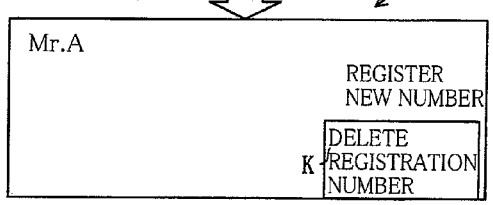
Figure 8H:
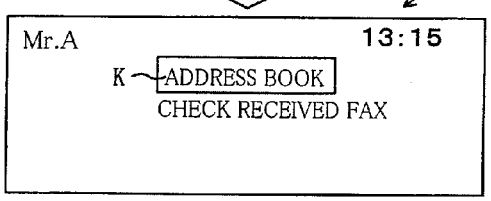

Then, where the cursor box K is moved to the addresser information to be deleted, and the determination key 40*d* is pressed, that is, the addresser information to be deleted is selected, the addresser information stored in the address book management table in correspondence with the user (Mr. A) is deleted, and a user basic display is displayed on the LCD 41, as shown in FIG. 8G, in a state in which the addresser information registered in correspondence with the user (Mr. A) is deleted. Thereafter, the display shown in FIG. 8G is displayed until the stop key 40*f* is pressed. Then, where the stop key 40*f* is pressed, a user basic display shown in FIG. 8H (the same as the user basic display shown in FIG. 6B) is displayed.

As thus described, in this address book changing processing, new addresser information can be registered into the address book management table for each user, and addresser information having been already registered for each user can be deleted from the address book management table.

Returning to the flow-chart in FIG. 5 again, the explanation is continued. After the address book changing processing (S507) described above is finished, the processing in S503 is repeated again. On the other hand, where the command display "ADDRESS BOOK" displayed on the user basic display shown in FIG. 6B is not selected in S505 (S505: No), the controller 80 judges, in S508, whether the command display "CHECK RECEIVED FAX" is selected or not. Where not selected (S508: No), the processings in S505 and the following steps are repeated. Where selected (S508: Yes), a received fax checking display is displayed in S509, and then the received fax checking processing described below is performed in S510.

Here, the processings so far will be specifically explained with reference to FIGS. 6B through 6E. Where the command display "ADDRESS BOOK" is not selected on the initial display shown in FIG. 6B, the cursor box K is moved to the command display "CHECK RECEIVED FAX" as shown in FIG. 6D, and the determination key 40d is pressed, the received fax checking display shown in FIG. 6E is displayed.

This received fax checking display is a display on which the histories of the received fax stored in the fax history table (with reference to FIG. 3A) are listed. As each of the histories of the fax, as shown in FIG. 6E, "ADDRESSER" (i.e., the "REGISTRATION NAME" 54) and "RECEIVED DATE" are displayed so as to be arranged in a line. Further, on a right side thereof, there is displayed "FAX-READ USER" showing a user having already visually recognized the fax. Specifically, in order from the top, the fax-read user does not exist with respect to fax "ADDRESSER: Mr. AA, RECEIVED DATE: 08/02/01", "Mr. B" and "Mr. A" exist as the fax-read user with respect to fax "ADDRESSER: Mr. AA, RECEIVED DATE: 07/12/11", and "Mr. A" exists as the fax-read user with respect to fax "ADDRESSER: Mr. BB, RECEIVED DATE: 07/12/10". It is noted that this history list is scrolled upward and downward by the user operating the direction keys 40c.

Figure 9:
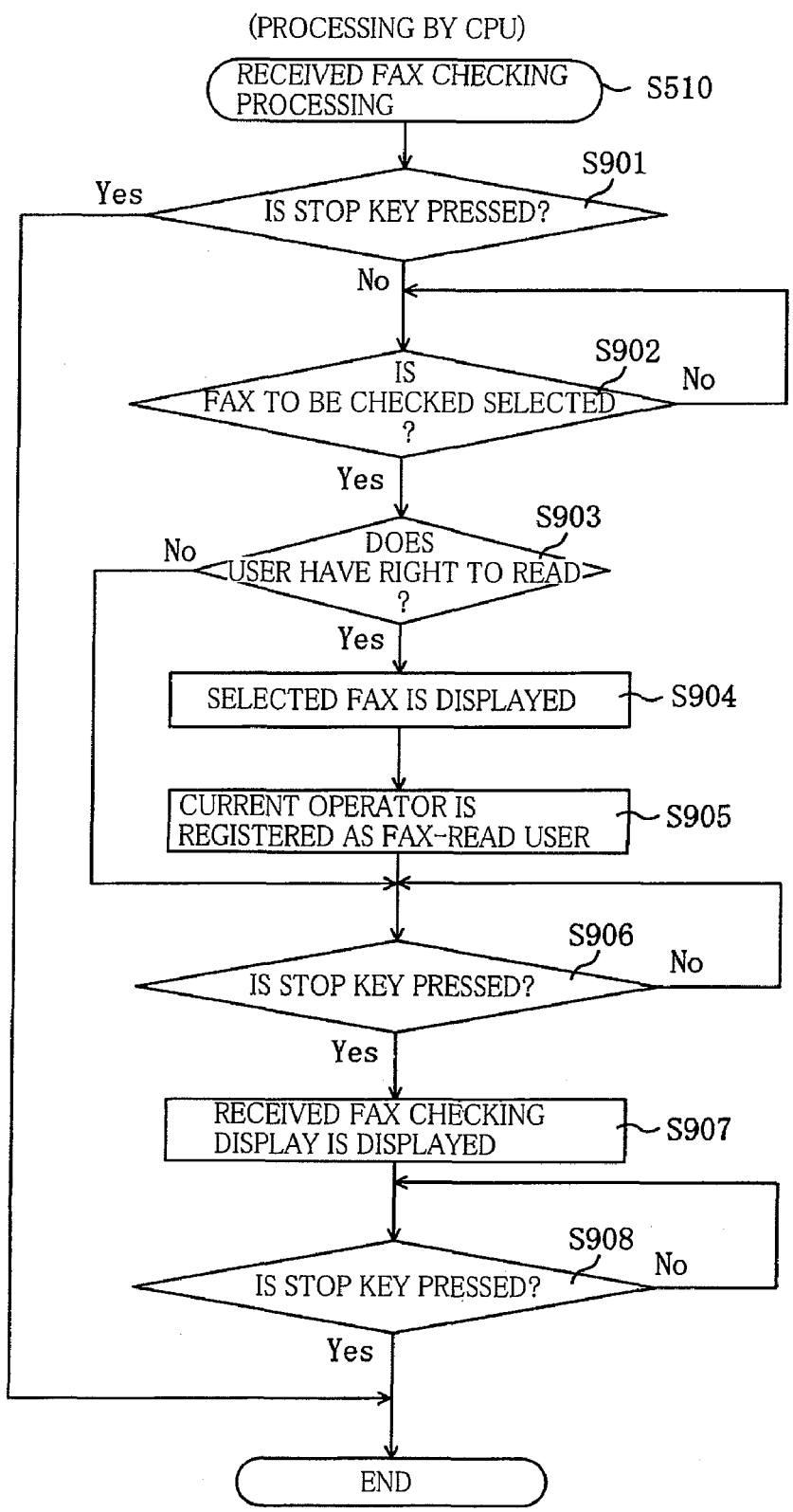
FIG. 9 is a flow-chart showing a received fax checking processing.

After the received fax checking display shown in FIG. 6E is displayed as thus described, the received fax checking processing is performed in S510. Here, there will be explained the received fax checking processing (S510) with reference to a flow-chart in FIG. 9, This processing is a processing in which selected fax is displayed on the LCD 41 in order to check the received fax.

In this processing, initially, the controller 80 judges, in S901, whether the stop key 40f is pressed or not. Where pressed (S901: Yes), this received fax checking processing is finished. Where not pressed (S901: No), the controller 80 judges, in S902, whether any of fax is selected in the fax history or not. Where not selected (S902: No), the processing in S902 is repeated. Where selected (S902: Yes), the controller 80 judges, in S903, whether the user has the right to read the fax or not. Whether the user has the right or not is judged by whether "00" is stored in a cell of the fax history table in the selected fax and the user currently operating.

As a result, where the controller 80 has judged that the user has the right to read (S903: Yes), the selected fax is displayed on the LCD 41. Specifically, fax stored in the fax-data memory 23a which corresponds to the selected fax history defined by the fax ID (or the received date and time) is read and displayed on the LCD 41 in S904. Then, in S905, a current operator is registered in the fax history table as the fax-read user. On the other hand, where the controller 80 has judged that the user does not have the right to read (S903: No), the above-described S904 and S905 are skipped, and the processing goes to S906. That is, the user not having the right to read cannot check a content of the fax. Thus, it can be prevented that the fax is visually recognized by the user not having the right to read. Further, a user who visually recognizes the fax afterwards can recognize the user having read the fax among the users having the right to read.

It is noted that, in this MFD 1, the controller 80 judges whether the user has the right to read or not at this timing (i.e., at a time in which the fax is selected), but the MFD 1 may be configured such that, where the received fax checking display is displayed in S509, the current user (Mr. A) cannot select fax which the user does not have the right to read, by not displaying a history of received fax which the user does not have the right to read.

Then, after the selected fax is displayed, the controller 80 judges, in S906, whether the stop key 40f is pressed or not. Where not pressed (S906: No), the processing in S906 is repeated. Where the stop key 40f is pressed (S906: Yes), the received fax checking display is displayed in S907. Then, the controller 80 judges again in S908, whether the stop key 40f is pressed or not. Where not pressed (S908: No), the processing in S908 is repeated. Where pressed (S908: Yes), this received fax checking processing is finished.

Here, the processings so far will be specifically explained with reference to FIGS. 10A through 10D. In the received fax checking processing, initially, where in a state in which a received fax checking display (the same as the received fax checking display shown in FIG. 6E) is displayed as shown in FIG. 10A, the cursor box K is moved to any of the fax histories by the user operating the direction keys 40c, and the determination key 40d is pressed, the controller 80 judges that the fax corresponded to the selected fax history is selected, and displays the fax as shown in FIG. 10B.

Figure 10A:
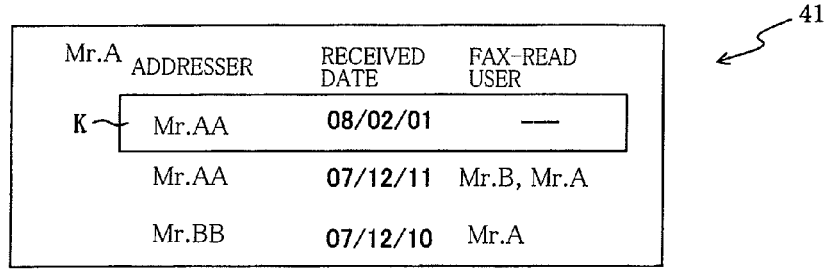
FIG. 10A through 10D are views each showing a display in the received fax checking processing.
Figure 10B:
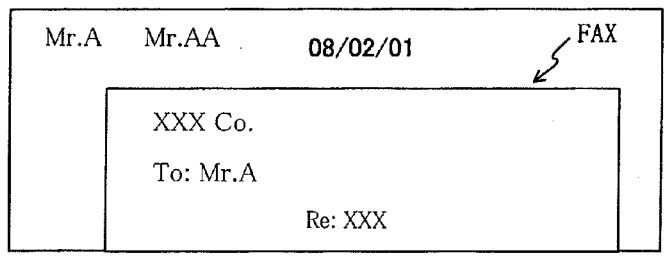

For example, where, as shown in FIG. 10A, fax "ADDRESSER: Mr. AA, RECEIVED DATE: 08/02/01" is selected, a content of the fax is read from the fax-data memory 23a and displayed as shown in FIG. 10B. It is noted that since the fax displayed on the LCD 41 is scrolled upward and downward by the user operating the direction keys 40c, the user can check the content of the fax.

Further, where the selected fax is displayed on the LCD 41, the user (Mr. A) currently operating is stored in the fax history table as the fax-read user who has read the selected fax. Specifically, information of the user A corresponding to the selected fax is rewritten to "10".

Figure 10C:
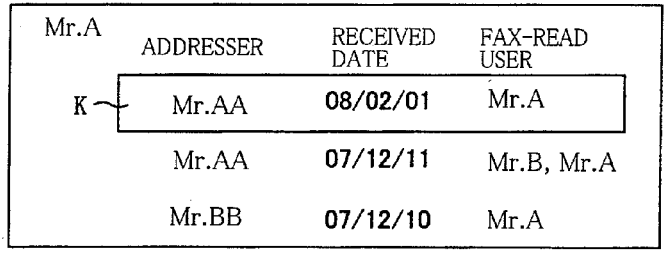

Then, when the stop key 40f is pressed, the received fax checking display is displayed again as shown in FIG. 10C. In this case, as shown in FIG. 10C, the user (Mr. A) having visually recognized the fax is displayed as the fax-read user with respect to the fax "ADDRESSER: Mr. AA, RECEIVED DATE: 08/02/01".

That is, before the user (Mr. A) visually recognizes the selected fax, the fax-read user of the selected fax does not exist on the received fax checking display shown in FIG. 10A, but, as shown in FIG. 10B, after the user (Mr. A) has visually recognized the selected fax, the recognition of the user (Mr. A) is stored in the fax history table, and thereafter, as shown in FIG. 10C, on the received fax checking display is displayed the user (Mr. A) as the fax-read user of the fax. Thus, the user about to display the fax "ADDRESSER: Mr. AA, RECEIVED DATE: 08/02/01" on the received fax checking display afterwards can recognize the fact that the fax has been recognized by the user (Mr. A). That is, a user about to output the fax can recognize, at a glance, whether the fax-read user of the fax exists or not.

Figure 10D:
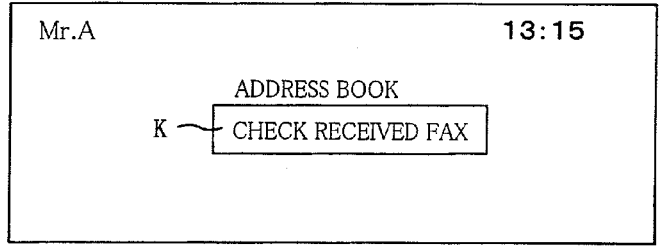

Then, where the stop key 40f is pressed again, the user basic display is displayed as shown in FIG. 10D, and the received fax checking processing is finished in S510. Then, where this received fax checking processing is finished in S510, the processings in S505 and the following steps are repeated again as shown in the flow-chart in FIG. 5.

In this MFD 1, as long as the proper user ID is not inputted (that is, the user is not specified), the fax is not outputted, and where a user having inputted the proper user ID visually recognizes the fax, the user is specified as the fax-read user. Thus, a user who visually recognizes the fax afterwards can certainly recognize who is the fax-read user having outputted and recognized the fax.

It is noted that, in this MFD 1, as shown in FIG. 6E, for example, the "ADDRESSER" and the "RECEIVED DATE" are displayed so as to be arranged in the line and, on the right side thereof, there is displayed the "FAX-READ USER" showing the user having already visually recognized the fax, but the present invention is not limited to this configuration.

Figure 11A:
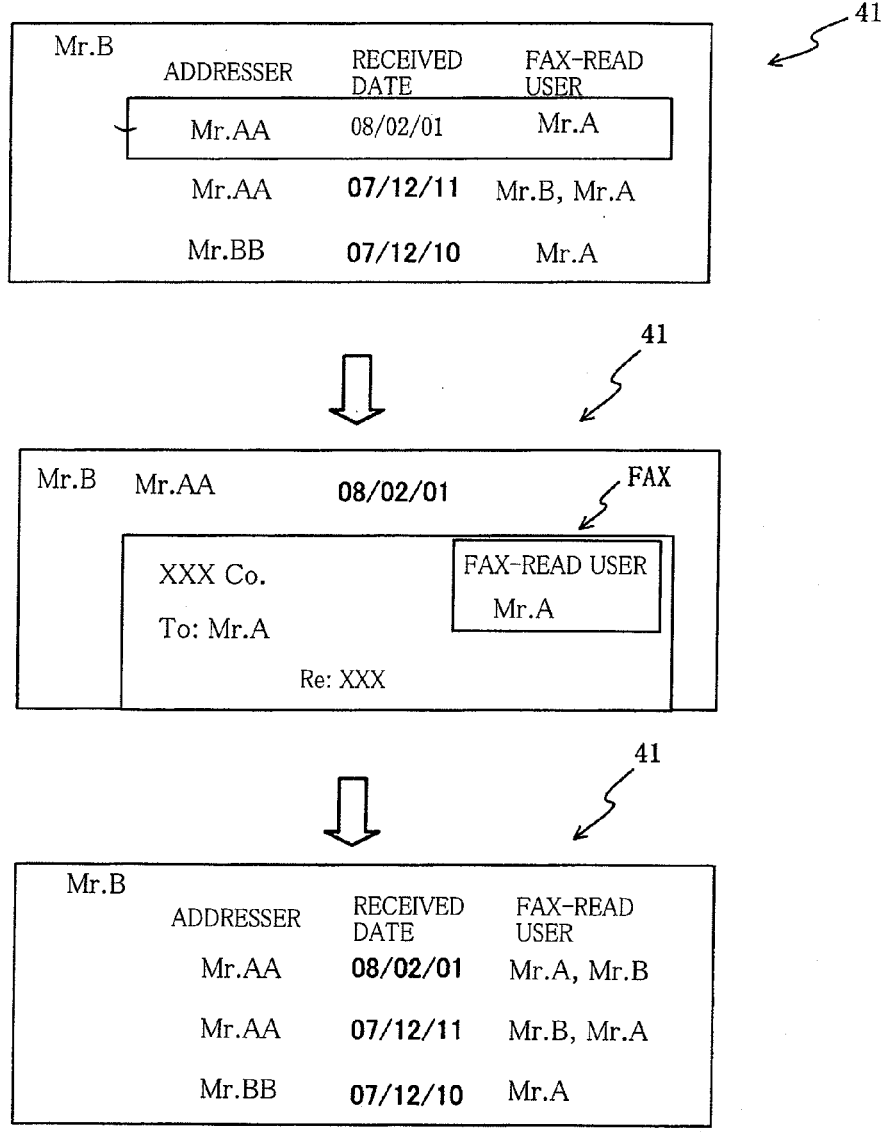
FIG. 11A through 11C are views each showing a display in a processing in a first modification of the present invention.
Figure 11B:
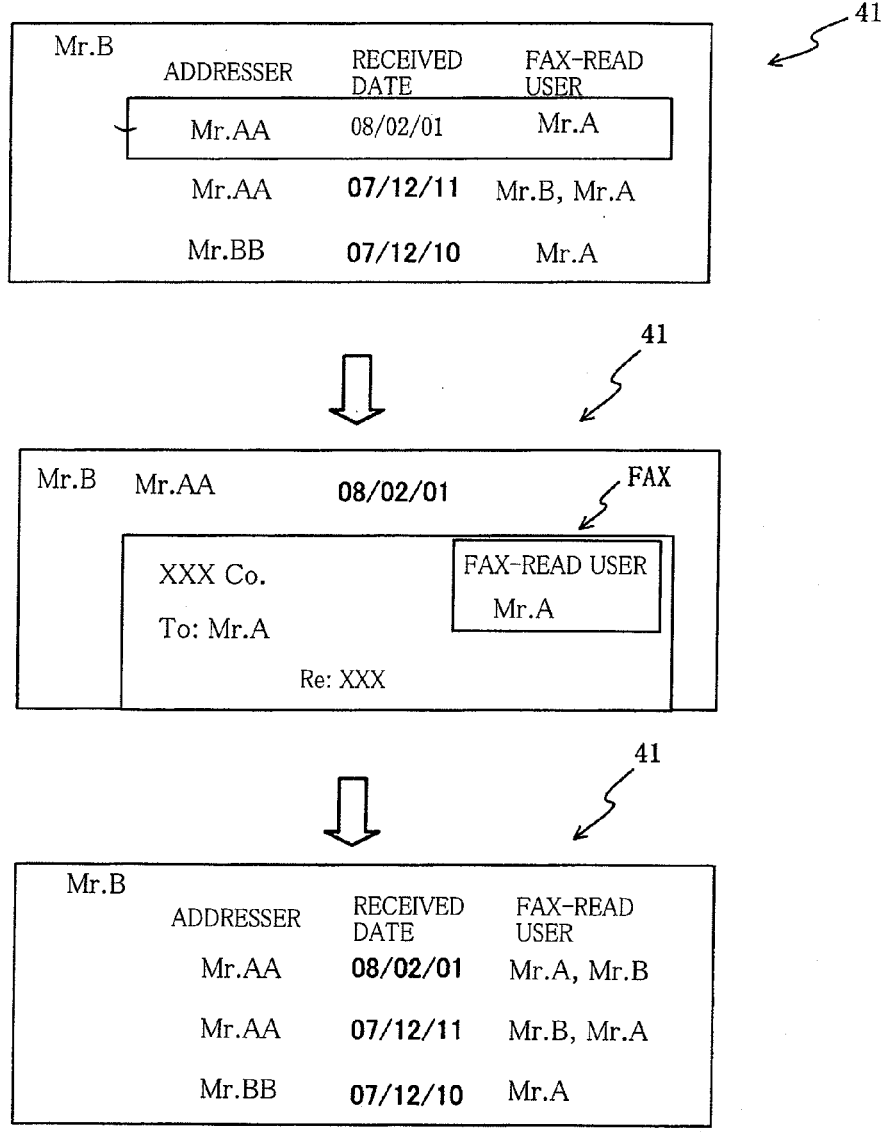
Figure 11C:
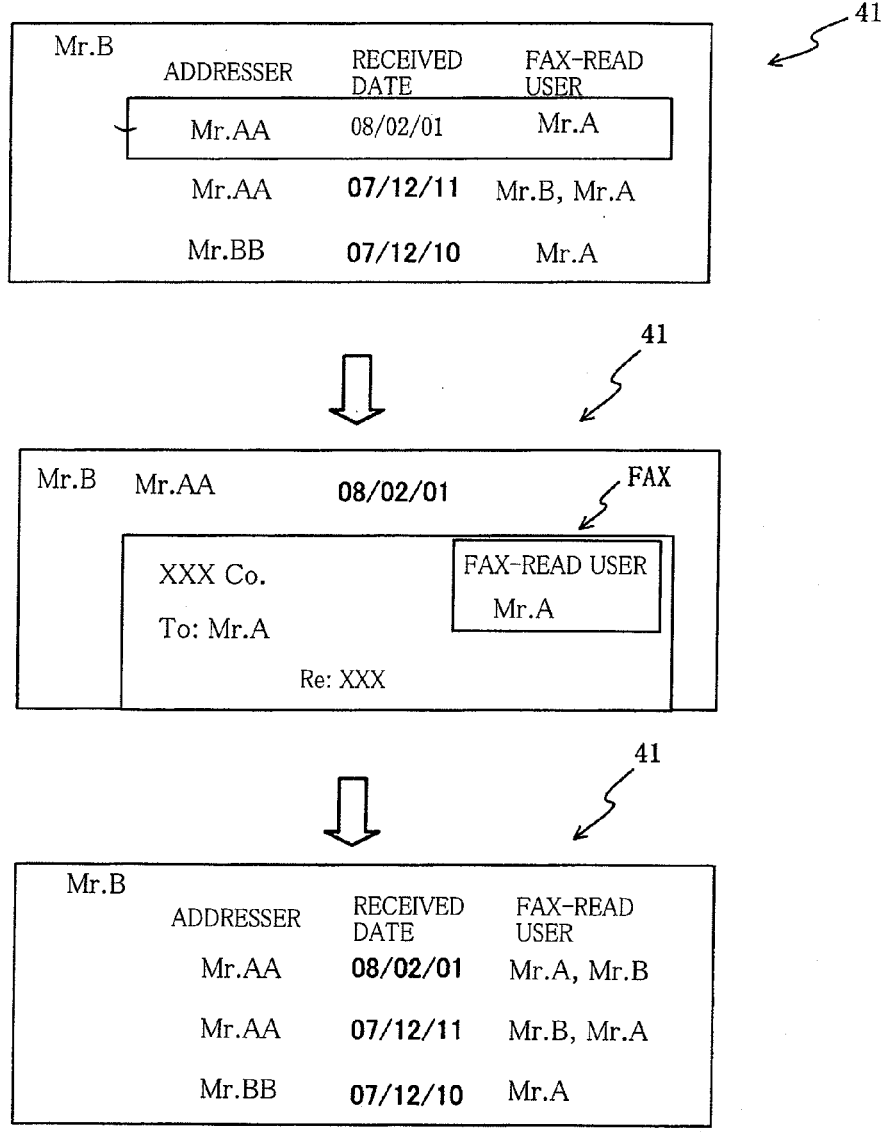

That is, as will be described below, there can be displayed the content of the fax and the fax-read user by combining each other. Hereinafter, there will be explained this first modification of the present invention with reference to FIGS. 11A through 11C. FIGS. 11A through 11C are views each showing a display of the LCD 41 displayed when Mr. B has inputted his user ID and checks the received fax after Mr. A has checked the content of the fax "ADDRESSER: Mr. AA, RECEIVED DATE: 08/02/01" as explained with reference to FIG. 10A through FIG. 10D.

When, in FIG. 11A, Mr. B has selected the fax "ADDRESSER: Mr. AA, RECEIVED DATE: 08/02/01", as shown in FIG. 11B, the content of the fax is displayed on the LCD 41, and an image "FAX-READ USER Mr. A" is displayed on a right upper portion of an image indicating the content of the fax. Then, as shown in FIG. 11C, the fax "ADDRESSER: Mr. AA, RECEIVED DATE: 08/02/01" is displayed with Mr. A and Mr. B being as the fax-read user. Thus, in this first modification, Mr. B can recognize that Mr. A has already visually recognized the content of the fax, while Mr. B checks the content of the fax. That is, like the above-described embodiment, a user can recognize, by the display shown in FIG. 11A, that Mr. A is the fax-read user having read the fax "ADDRESSER: Mr. AA, RECEIVED DATE: 08/02/01", but in addition thereto, in this first modification, a user can recognize the fax-read user more certainly because the fax-read user is displayed so as to be combined with the content of the fax.

Figure 12:
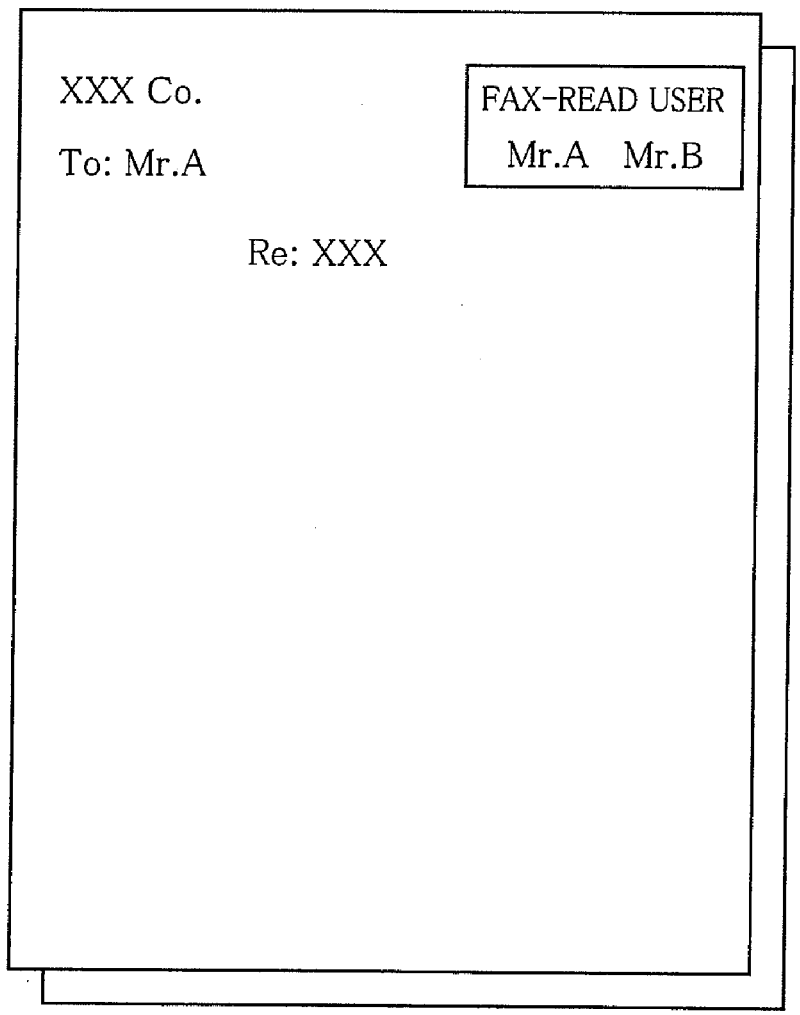
FIG. 12 is a view showing recording sheets recorded in a second modification.

Further, in the above-described embodiment and first modification, a user can recognize that the fax-read user exists, by displaying the fax-read user on the LCD 41, but the present invention is not limited to this configuration. For example, the content of the fax and the fax-read user can be recorded on the recording sheet by the printer section 2 as the outputting device in a state in which the fax-read user is combined with the content of the fax. Hereinafter, there will be explained this second modification of the present invention with reference to FIG. 12. FIG. 12 shows a content of a recording sheet on which are recorded the content of the fax and the fax-read user in a state in which the content of the fax is combined with the fax-read user.

Where Mr. A has commanded the printer section 2 as the outputting device to recorded the fax "ADDRESSER: Mr. AA, RECEIVED DATE: 08/02/01" shown in FIG. 11C on the recording sheet, the recoding sheet on which the content shown in FIG. 12 is recorded is outputted from the MFD 1. On a cover of the recording sheet, there are recorded the content of the fax and a display "FAX-READ USER Mr. A Mr. B". Thus, Mr. A who is about to see the cover of the recording sheet can recognize that each of Mr. A and Mr. B is the fax-read user.

In view of the above, the controller 80 can be considered to include an identifying information displaying controlling section which controls the LCD 41 to display the list of the identifying information and which performs the processing in S509.

Further, in view of the above, the controller 80 can be considered to further include a selecting section which selects the identifying information from the list displayed by the identifying information displaying controlling section and which performs a part of the processing in S902.

Further, in view of the above, the controller 80 can be considered to further include an outputting controlling section which controls at least one of the LCD 41 and the printer section 2 to output the fax corresponded to the identifying information having been selected by the selecting section and which performs the processing in S904.

Further, in view of the above, the controller 80 can be considered to further include an informing section that informs, by displaying, the outputted information stored in the fax history memory 23b in a state in which the outputted information is combined with at least one of the identifying information (the addresser information and the receiving date) and the facsimile information corresponded to the outputted information, and that performs the processing in S907.

Further, in view of the above, the controller 80 can be considered to further include a specifying section which specifies the operator having operated the selecting section and which performs the processing in S502. In this case, the fax history memory 23b is configured to store information of the operator having been specified by the specifying section as the outputted information. Further, the outputting controlling section is configured to control the at least one of the LCD 41 and the printer section 2 to output the fax on condition that the operator has been specified by the specifying section.

Further, in view of the above, the controller 80 can be considered to further include a judging section which judges whether the operator having been specified by the specifying section is the output permitted person or not and which performs the processing in S903. In this case, where the judging section has judged that the operator having been specified by the specifying section is the output permitted person, the outputting controlling section permits the at least one of the LCD 41 and the printer section 2 to output the fax. On the other hand, where the judging section has judged that the operator having been specified by the specifying section is not the output permitted person, the outputting controlling section inhibits any of the LCD 41 and the printer section 2 from outputting the fax.

It is to be understood that the invention is not limited to the details of the illustrated embodiment, but may be embodied with various changes and modifications, which may occur to those skilled in the art, without departing from the spirit and scope of the invention.

In this MFD 1, where the user having the right to read has selected any of the fax among the fax histories shown in FIG. 10A, the user having selected is stored in the fax history table as the fax-read user. However, the MFD 1 may be configured such that where an entire fax sheet of the selected fax cannot be displayed on the LCD 41, and the entire fax sheet is permitted to be displayed only after the direction keys 40c are operated several times, the user is stored as the fax-read user not where the fax is selected, but where the direction keys 40c are pressed several times after the fax is selected. Where the direction keys 40c are not pressed several times, there is a possibility in which the selected fax is not visually recognized. Thus, where the MFD 1 is configured as such, only the user having visually recognized the fax can be stored.

Further, the MFD 1 may also be configured such that a portion of the selected fax which has been actually displayed on the LCD 41 (or example, where the direction keys 40c is pressed once, one eighth of the entire fax sheet is displayed, and where pressed twice, one fourth of the entire fax sheet is displayed) is stored, and a portion of the selected fax which has been visually recognized can be displayed in correspondence to the fax-read user. Further, in this case, the MFD 1 may be configured that a portion of the fax which has been displayed and a portion of the fax which has not been displayed yet are displayed such that the portions are respectively displayed in different colors.

In this MFD 1, the fax-read user is displayed on the LCD 41 in correspondence with each of the histories of the fax displayed in the history list of the fax, but the MFD 1 may be configured such that the fax-read user is informed by a voice outputted by the speaker 74 without displaying the fax-read user on the LCD 41, for example.

In this MFD 1, where the user has selected the fax from the list of the fax histories shown in FIG. 10A, the content of the selected fax is displayed on the LCD 41 as shown in FIG. 10B, but this MFD 1 is not limited to this configuration. That is, the MFD 1 may be configured such that where the user has selected the fax from the list of the fax histories shown in FIG. 10A, the fax is recorded on the recording sheet by the printer section 2 as the outputting device. Also where the fax is recorded on the recording sheet by the printer section 2 in this configuration, like the above-described embodiment, the operator is registered as the fax-read user, whereby users about to see the fax can recognize that the fax has been visually recognized by the user.

What is claimed is:

1. A facsimile apparatus, comprising:
   a receiving device configured to receive facsimile information;
   an identifying information providing portion configured to provide identifying information for identifying the facsimile information received by the receiving device;
   a facsimile information storing device configured to store the facsimile information and the identifying information provided by the identifying information providing portion in a state in which the identifying information is corresponded to the facsimile information;
   an identifying information displaying controlling section configured to control a display device to display a list of the identifying information stored in the facsimile information storing device;
   a selecting section configured to select the identifying information from the list displayed by the identifying information displaying controlling section;
   an outputting controlling section configured to control at least one of the display device and an outputting device to output the facsimile information corresponded to the identifying information having been selected by the selecting section;
   an output-indicative-information storing device configured to store output indicative information indicating that the facsimile information corresponding to the identifying information has already been outputted by the outputting controlling section; and
   an informing section configured to inform a user about the output indicative information stored in the output-indicative-information storing device, the output indicative information corresponding to the identifying information.

2. The facsimile apparatus according to claim 1, further comprising a specifying section configured to specify an operator having operated the selecting section,
   wherein the output-indicative-information storing device is configured to store information of the operator having been specified by the specifying section as the output indicative information.

3. The facsimile apparatus according to claim 2,
   wherein the outputting controlling section is configured to control the at least one of the display device and the outputting device to output the facsimile information on condition that the operator has been specified by the specifying section.

4. The facsimile apparatus according to claim 3, further comprising:
   an output permitted person storing device configured to store, in correspondence with the identifying information, an output permitted person as an operator who is permitted to cause the outputting controlling section to control the at least one of the display device and the outputting device to output the facsimile information; and
   a judging section configured judge whether the operator having been specified by the specifying section is the output permitted person or not,
   wherein the outputting controlling section is configured to permit the at least one of the display device and the outputting device to output the facsimile information where the judging section has judged that the operator having been specified by the specifying section is the output permitted person, and
   wherein the outputting controlling section is configured to inhibit any of the display device and the outputting device from outputting the facsimile information where the judging section has judged that the operator having been specified by the specifying section is not the output permitted person.

5. The facsimile apparatus according to claim 1,
   wherein the informing section is configured to display the output indicative information in a state in which the output indicative information is associated with the identifying information corresponded to the output indicative information, in the list of the identifying information which is displayed by the identifying information displaying controlling section.

6. The facsimile apparatus according to claim 1,
   wherein the identifying information includes addresser information of the facsimile information and receiving date of the facsimile information, and
   wherein the informing section is configured to inform the user about output indicative information in a state in which the output indicative information is associated with the addresser information and the receiving date.

7. The facsimile apparatus according to claim 6, further comprising an addresser related information storing device configured to store the addresser information and operator information related to the addresser information, in a state in which the operator information is corresponded to the addresser information.

8. The facsimile apparatus according to claim 7, further comprising an identifying information related information storing device configured to store (a) the identifying information stored in the facsimile information storing device and (b) the operator information stored in the addresser related information storing device, in a state in which the operator information is corresponded to the identifying information.

9. The facsimile apparatus according to claim 8,
   wherein the operator information stored in the identifying information related information storing device includes information whether the operator has a right to cause the at least one of the displaying device and the outputting device to output the facsimile information to which the identifying information corresponded to the operator information is provided.

10. The facsimile apparatus according to claim 8,
    wherein the operator information stored in the identifying information related information storing device includes the output indicative information stored in the output-indicative-information storing device.

11. The facsimile apparatus according to claim 8,
    wherein the identifying information displaying controlling section is configured to control the display device to display the list on the basis of information read from the identifying information stored in the identifying information related information storing device.

12. A facsimile apparatus, comprising:
a receiving device configured to receive facsimile information;
an identifying information providing portion configured to provide identifying information for identifying the facsimile information received by the receiving device;
a facsimile information storing device configured to store the facsimile information and the identifying information provided by the identifying information providing portion in a state in which the identifying information is corresponded to the facsimile information;
an outputting controlling section configured to control at least one of a display device and an outputting device to output the facsimile information corresponded to the identifying information;
an output-indicative-information storing device configured to store output indicative information indicating that the facsimile information corresponding to the identifying information has already been outputted by the outputting controlling section; and
an informing section configured to inform a user about the output indicative information stored in the output-indicative-information storing device, the output indicative information corresponding to the identifying information.

13. The facsimile apparatus according to claim 12,
wherein the identifying information includes addresser information of the facsimile information and receiving date of the facsimile information, and
wherein the informing section is configured to inform the user about the output indicative information in a state in which the output indicative information is associated with the addresser information and the receiving date.

14. The facsimile apparatus according to claim 13, further comprising an addresser related information storing device configured to store the addresser information and operator information related to the addresser information, in a state in which the operator information is corresponded to the addresser information.

15. The facsimile apparatus according to claim 14, further comprising an identifying information related information storing device configured to store (a) the identifying information stored in the facsimile information storing device and (b) the operator information stored in the addresser related information storing device, in a state in which the operator information is corresponded to the identifying information.

16. The facsimile apparatus according to claim 15,
wherein the operator information stored in the identifying information related information storing device includes information whether the operator has a right to cause the at least one of the displaying device and the outputting device to output the facsimile information to which the identifying information corresponded to the operator information is provided.

17. The facsimile apparatus according to claim 16,
wherein the operator information stored in the identifying information related information storing device includes the output indicative information stored in the output-indicative-information storing device.

18. The facsimile apparatus according to claim 15, further comprising an identifying information displaying controlling section configured to control the display device to display the identifying information on the basis of information read from the identifying information stored in the identifying information related information storing device.

19. The facsimile apparatus according to claim 18, further comprising a selecting section configured to select the identifying information from a list of the identifying information which is displayed by the identifying information displaying controlling section.

20. A facsimile apparatus, comprising:
a receiving device configured to receive facsimile information;
an identifying information providing portion configured to provide identifying information for identifying the facsimile information received by the receiving device;
a facsimile information storing device configured to store the facsimile information and the identifying information provided by the identifying information providing portion in a state in which the identifying information is corresponded to the facsimile information;
an identifying information displaying controlling section configured to control a display device to display a list of the identifying information stored in the facsimile information storing device;
a selecting section configured to select the identifying information from the list displayed by the identifying information displaying controlling section;
an outputting controlling section configured to control at least one of the display device and an outputting device to output the facsimile information corresponded to the identifying information having been selected by the selecting section;
an output-indicative-information storing device configured to store output indicative information indicating that the facsimile information corresponding to the identifying information has already been outputted by the outputting controlling section; and
an informing section configured to inform a user about the output indicative information stored in the output-indicative-information storing device, the output indicative information corresponding to the identifying information.

* * * * *